United States Patent
Itoga (10) Patent No.: US 10,014,534 B2
(45) Date of Patent: Jul. 3, 2018

(54) FUEL CELL SYSTEM

(71) Applicant: TOYOTA JIDOSHA KABUSHIKI KAISHA, Toyota-shi, Aichi-ken (JP)

(72) Inventor: Michitaro Itoga, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 14/940,856

(22) Filed: Nov. 13, 2015

(65) Prior Publication Data
US 2016/0141652 A1    May 19, 2016

(30) Foreign Application Priority Data
Nov. 14, 2014    (JP) .................................. 2014-232029

(51) Int. Cl.
| | | |
|---|---|---|
| *H01M 8/04089* | (2016.01) | |
| *B60L 11/18* | (2006.01) | |
| *H01M 8/04119* | (2016.01) | |
| *H01M 8/04223* | (2016.01) | |

(52) U.S. Cl.
CPC ..... *H01M 8/04097* (2013.01); *B60L 11/1898* (2013.01); *H01M 8/04156* (2013.01); *H01M 8/04253* (2013.01); *H01M 2250/20* (2013.01); *Y02T 90/32* (2013.01); *Y02T 90/34* (2013.01)

(58) Field of Classification Search
CPC ........... B60L 11/1898; H01M 2250/20; H01M 8/04097; H01M 8/04156; H01M 8/04253
See application file for complete search history.

(56) References Cited

U.S. PATENT DOCUMENTS

| | | | |
|---|---|---|---|
| 2009/0280371 A1* | 11/2009 | Katano | ............. H01M 8/04089 429/421 |
| 2010/0062319 A1 | 3/2010 | Katano et al. | |
| 2011/0079455 A1 | 4/2011 | Katano | |

FOREIGN PATENT DOCUMENTS

| | | |
|---|---|---|
| CN | 101243572 A | 8/2008 |
| JP | 2008-004524 A | 1/2008 |
| JP | 2008-130492 A | 6/2008 |
| JP | 2008-177100 | 7/2008 |
| JP | 2009-105076 A | 5/2009 |
| JP | 2009-259593 | 11/2009 |
| JP | 2009-298196 | 12/2009 |
| JP | 2014-40752 | 3/2014 |
| JP | 2014-44797 | 3/2014 |
| KR | 10-2008-0034512 A | 4/2008 |
| WO | WO 2008/087542 | 7/2008 |

* cited by examiner

*Primary Examiner* — Ula C Ruddock
*Assistant Examiner* — Ben Lewis
(74) *Attorney, Agent, or Firm* — Finnegan, Henderson, Farabow, Garrett & Dunner, LLP (57) ABSTRACT

A fuel cell system, includes: a fuel cell stack that is formed by stacking fuel cells for causing electrochemical reaction of a fuel gas and an oxidizing gas; a fuel gas supply system that is configured to supply the fuel gas to the fuel cell stack from a supply source of the fuel gas; a fuel gas recirculating system that is configured to resupply to the fuel cell stack the fuel gas discharged from the fuel cell stack; and a piping member is configured to connect a junction between the fuel gas supply system and the fuel gas recirculating system with the supply source, the piping member having a bent portion that is curved such that a supply direction of the fuel gas from the supply source is reverse to a flowing direction of the fuel gas toward the junction.

2 Claims, 7 Drawing Sheets

FUEL CELL SYSTEM

CROSS-REFERENCE TO RELATED APPLICATION

This application claims priority to Japanese Patent Application No. 2014-232029, filed on Nov. 14, 2014, the contents of all of which are incorporated herein by reference in their entirety.

BACKGROUND

Field

The present invention relates to a fuel cell system.

Related Art

Conventionally, it is known that a fuel cell causes electrochemical reactions of fuel gas and oxidizing gas. It is also known that, for example, JP2009-298196A discloses a fuel cell system provided with a fuel gas supply system which supplies fuel gas to a fuel cell from a supply source of the fuel gas, and, in addition, in order to improve the fuel consumption of the fuel cell, a fuel gas recirculating system which resupplies to the fuel cell the fuel gas discharged from the fuel cell.

However, water existing in the fuel gas recirculating system flows into the fuel gas supply system, thereby causing a possible malfunction etc. of the fuel cell due to corrosion and freeze of components of the fuel gas supply system. Particularly, when the fuel cell system is not operating, the fuel gas does not flow into the fuel gas recirculating system and the fuel gas supply system, thereby causing a possible corrosion etc. of the components of the fuel gas supply system.

Here, a method of preventing water from flowing into the fuel gas supply system by disposing an upstream part of the fuel gas supply system higher than a junction between the fuel gas recirculating system and the fuel gas supply system, can be considered. However, if this method is adopted, a subject arises in which the height of the fuel cell system becomes higher. Particularly, if the fuel cell is mounted under a floor of the vehicle, it is difficult to reserve the mounting space because of height restrictions.

SUMMARY

The present invention is made in order to address at least a part of the subject described above, and can be implemented in terms of the following aspects.

(1) According to one aspect of the invention, a fuel cell system is provided. The fuel cell system includes: a fuel cell stack that is formed by stacking fuel cells for causing electrochemical reaction of a fuel gas and an oxidizing gas; a fuel gas supply system that is configured to supply the fuel gas to the fuel cell stack from a supply source of the fuel gas; a fuel gas recirculating system that is configured to resupply to the fuel cell stack the fuel gas discharged from the fuel cell stack; and a piping member is configured to connect a junction between the fuel gas supply system and the fuel gas recirculating system with the supply source, the piping member having a bent portion that is curved such that; a supply direction of the fuel gas from the supply source is reverse to a flowing direction of the fuel gas toward the junction. According to this aspect, since the bent portions are provided, water which remains in the fuel gas recirculating system can be prevented from flowing into the fuel gas supply system, and a corrosion of the fuel gas supply system components can be prevented. Since the bent portions are curved so that the supply direction of the fuel gas from the supply source is opposite from the flowing direction of the fuel gas to the junction, the height of the fuel cell system can be prevented from being higher.

(2) The fuel cell system of the aspect described above may further include a plurality of auxiliary machines used for operation of the fuel cell stack. The plurality of auxiliary machines are disposed between the fuel cell stack and the piping member in stacking directions of the fuel cell. According to this aspect, a space between the piping member and the fuel cell can effectively be utilized.

(3) In the fuel cell system of the aspect described above, the plurality of auxiliary machines may include a fuel gas pump for recirculating the fuel gas in the fuel gas recirculating system. The fuel gas pump may be disposed at a position where the fuel gas pump overlaps with at least a part of the piping member in the stacking directions of the fuel cell. According to this aspect, when the piping member is collided by other adjacent members in a direction toward the fuel cell stack in the stacking directions of the fuel cell, other adjacent members collide the fuel gas pump before the piping member is completely divided due to the collision. Therefore, the possible dividing of the piping can be reduced.

(4) In the fuel cell system of the aspect described above, at least a part of the fuel gas pump may be disposed at the most distant position from the fuel cell stack in the stacking direction of the fuel cell, among the plurality of auxiliary machines. According to this aspect, when other adjacent members collide the fuel cell system in the direction toward the fuel cell stack in the stacking directions of the fuel cell, the fuel gas pump collides other adjacent members prior to other auxiliary machines. Therefore, the auxiliary machines other than the fuel gas pump can be protected.

The present invention can be implemented in various forms, for example, can be implemented in the forms of a method of manufacturing a fuel cell case, a computer program for implementing the manufacturing method, a recording medium that records the computer program, etc.

DESCRIPTION OF EMBODIMENTS

A. Embodiment

Figure 1:
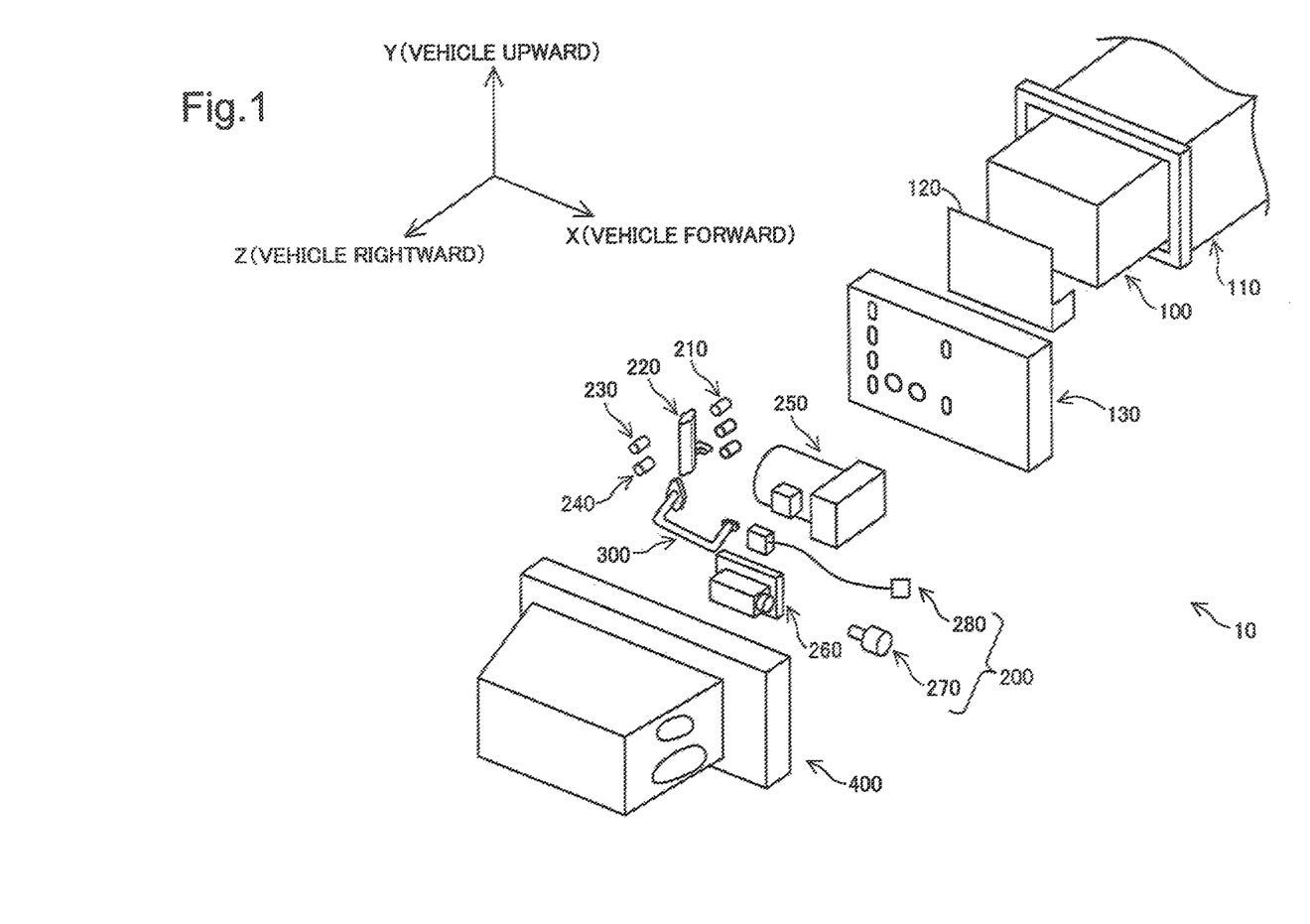
FIG. 1 is an exploded perspective view of a fuel cell system used for one embodiment of the invention.

FIG. 1 is an exploded perspective view of a fuel cell system 10 used for one embodiment of the invention. The fuel cell system 10 includes a fuel cell stack 100, a stack covering 110, a current collector 120, a manifold 130, a plurality of auxiliary machines 200, a piping member 300, and an auxiliary-machinery covering 400.

The fuel cell system 10 is mounted on a vehicle. In this embodiment, the fuel cell system 10 is disposed below a vehicle cabin where a vehicle operator and passengers are accommodated. In FIG. 1, positive in X-axis directions indicates forward of the vehicle, positive in Y-axis directions indicates upward of the vehicle, and positive in Z-axis directions indicates rightward of the vehicle. The XYZ coordinate system is also the same in other drawings subsequent to FIG. 1.

The fuel cell stack 100 is formed by stacking fuel cells, each of which causes electrochemical reactions of fuel gas and oxidizing gas. In this embodiment, a stacking direction of the fuel cells is in the vehicle width directions (Z-axis directions). In this embodiment, hydrogen gas is used as the fuel gas, and oxygen gas is used as the oxidizing gas.

The stack covering 110 is a covering for covering the fuel cell stack 100. The current collector 120 collects electric power produced in each of the fuel cells. The current collector 120 is disposed rightward of the fuel cell stack 100 (positive side in Z-axis directions).

The manifold 130 forms flow paths of fuel gas, oxidizing gas, and cooling water which cools the fuel cell stack 100. The manifold 130 is also provided with a function to secure electrical insulation inside the stack covering 110, as well as a function to mutually compress the fuel cells. The manifold 130 is disposed further rightward of the current collector 120 (positive in Z-axis directions). A plurality of holes and openings are formed in a right-side surface of the manifold 130 (positive side in Z-axis directions).

The plurality of auxiliary machines 200 are auxiliary machinery used for operation of the fuel cell stack 100, and are covered by the auxiliary-machinery covering 400. The plurality of auxiliary machines 200 include injectors 210, a distribution piping 220, a pressure sensor 230, a pressure relief valve 240, a fuel gas pump 250, a gas-liquid separator 260, a purge valve 270, and a wire harness 280.

The plurality of injectors 210 are connected in parallel with corresponding holes in the manifold 130 at one ends, and are connected with the distribution piping 220 at the other ends. The distribution piping 220 is connected with corresponding holes in the manifold 130 at one end, and is connected with the plurality of injectors 210 at the other end. The pressure sensor 230 and the pressure relief valve 240 are provided near the injectors 210 and are connected with corresponding holes in the manifold 130. The fuel gas pump 250 is connected with the manifold 130 and forces the fuel gas to recirculate. The wire harness 280 is provided with electric wires which supply electric power to the fuel gas pump 250. The gas-liquid separator 260 is connected with the manifold 130 and provided with a function to remove water from fuel gas which recirculated through the fuel cell stack 100. The purge valve 270 is connected with the gas-liquid separator 260 and provided with a function to discharge water removed by the gas-liquid separator 260.

The fuel gas flow is described below. The fuel gas supplied from a fuel-gas supply source (not illustrated) is then supplied to the manifold 130 via a regulator and a piping. The fuel gas at high pressure which flows into the manifold 130 is depressurized by passing through the injectors 210 connected in parallel with the manifold 130, after passing through the distribution piping 220. A pressure of the fuel gas depressurized by the injector 210 is measured by the pressure sensor 230. Note that when the depressurizing by the injector 210 is insufficient, the fuel gas is discharged from the pressure relief valve 240.

The fuel gas at low pressure discharged from the injector 210 passes through the flow paths formed in the manifold 130, passes through the piping member 300 connected with the manifold 130, and is then supplied to the fuel gas pump 250. The fuel gas supplied to the fuel gas pump 250 passes through the manifold 130, and is then supplied to the fuel cell stack 100. The fuel gas which passed through the fuel cell stack 100 is again supplied to the fuel gas pump 250, after moisture is separated from the fuel gas by passing through the gas-liquid separator 2600 Note that the fuel gas containing moisture and impurities is discharged to an exhaust pipe via the purge valve 270 provided to the gas-liquid separator 260.

Note that the term "fuel gas supply system" as used herein refers to a system for supplying fuel gas to the fuel cell stack 100 from the fuel-gas supply source, and the term "fuel gas recirculating system" as used herein refers to a system for resupplying to the fuel cell stack 100 the fuel gas discharged from the fuel cell stack 100. Components of the fuel gas supply system include the injectors 210, the distribution piping 220, the pressure sensor 230, the pressure relief valve 240, and the piping member 300. That is, the piping member 300 is a part of the fuel gas supply system. Components of the fuel gas recirculating system include the fuel gas pump 250, the gas-liquid separator 260, and the purge valve 270. A junction between the fuel gas supply system and the fuel gas recirculating system exists in the fuel gas pump 250.

Figure 2:
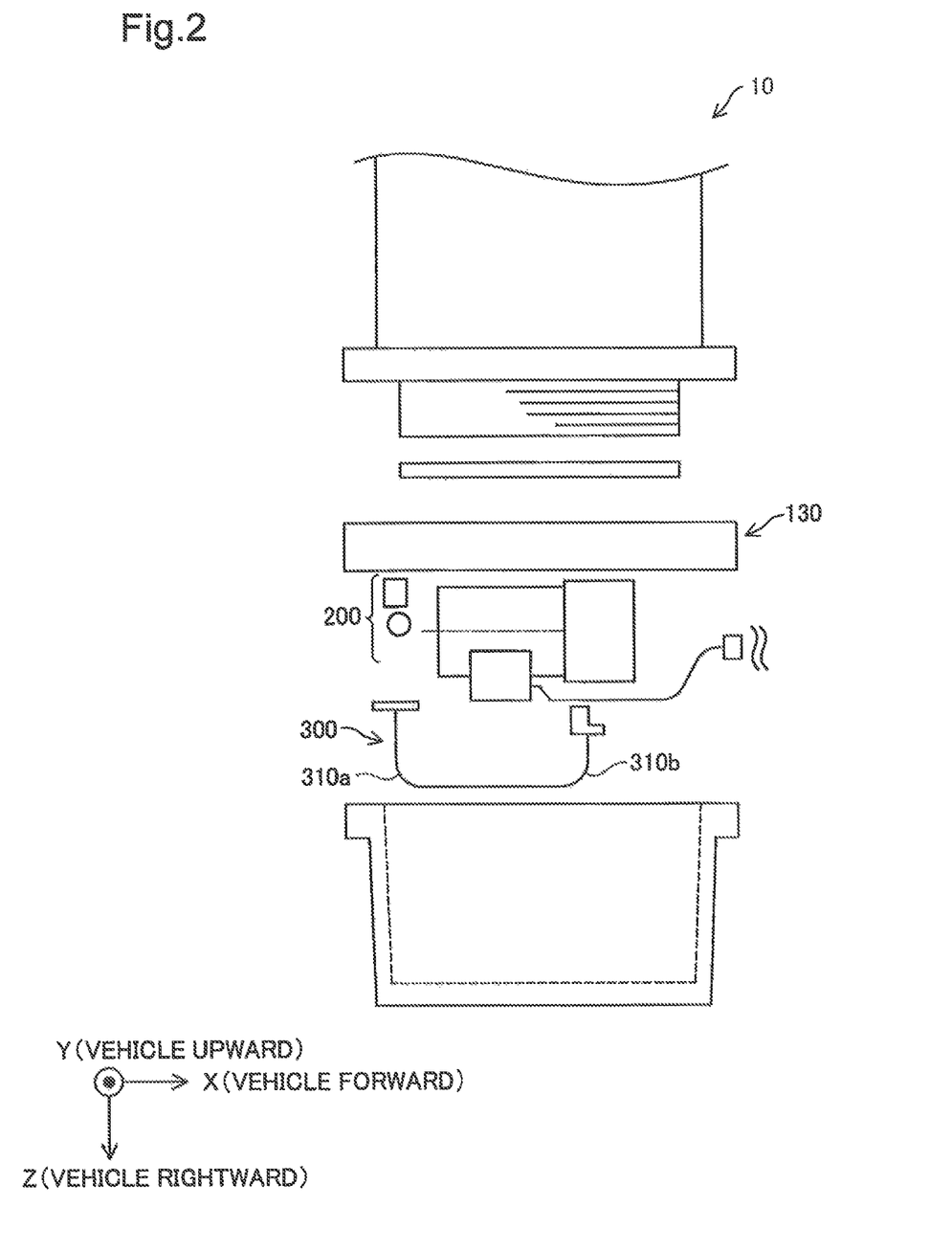
FIG. 2 is a schematic view illustrating a state where a plurality of auxiliary machines, a piping member, etc. are connected with a manifold.

FIG. 2 is a schematic view illustrating a state where the plurality of auxiliary machines 200, the piping member 300, etc. are connected with the manifold 130.

As can also be seen from FIG. 2, the piping member 300 is provided with bent portions 310 (310a, 310b) so that the piping member 300 is curved. The bent portions 310 are formed to have a supply direction of fuel gas from the supply source being substantially opposite to a flowing direction of the fuel gas to the junction directions of an entry and an exit of the fuel gas are oriented substantially opposite). The phrase "supply direction of fuel gas from the supply source is substantially opposite to the flowing direction of the fuel gas to the junction" as used herein refers to a directional difference between the supply direction and the flowing direction being within a range of about 180 degrees to about 270 degrees.

Figure 3:
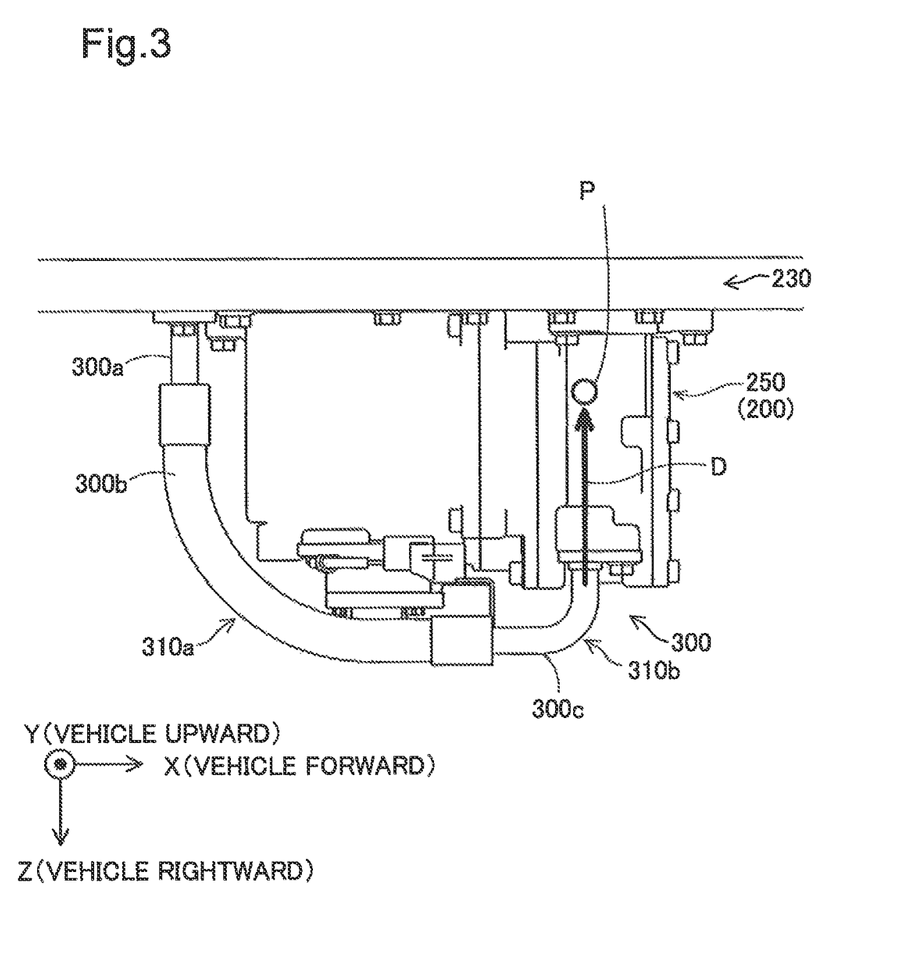
FIG. 3 is a schematic view of the piping member seen from above the vehicle (seen from positive Y-axis direction)

FIG. 3 illustrates a schematic view of the piping member 300 seen from above the vehicle (seen from positive Y-axis direction). Here, the junction between the fuel gas supply system and the fuel gas recirculating system is indicated as a point P, and the flowing direction of the fuel gas is indicated as a direction D. As can be seen from this drawing, since the piping member 300 is provided with the bent portions 310, water which remains in the fuel gas recirculating system is prevented from flowing into the fuel gas supply system, thereby a corrosion of the fuel gas supply system components can be reduced. Particularly, this presents a remarkable effect when the fuel cell system is not operating (i.e., the remarkable effect can be achieved when the fuel gas is not flowing. The reason is described below.

Here, it is assumed that water exists at the point P. When the vehicle to which the fuel cell system 10 is mounted is stopped at a place where the left side of the place is higher than the right side of the place (i.e., a downward sideway slope to the right side), although water which exists at the point P moves up to the bent portion 310b, but it does not move further toward the upstream in the direction D. Moreover, when the vehicle to which the fuel cell system 10 is mounted is stopped at a horizontal place, or a place where either the front side or the rear side of the place is inclined upwardly, it is hard for the water which exists at the point P to move because the entry point and the exit point of the piping member 300 are substantially at the same height, as described later. Moreover, when the vehicle to which the fuel cell system 10 is mounted is stopped at a place where the right side of the place is higher than the left side of the place (i.e., a downward sideway slope to the left side), water which exists at the point P moves to the upstream in the direction D beyond the bent portion 310b. As described above, since the bent portions 310 are provided in the piping member 300 so that the supply direction of fuel gas from the supply source is substantially opposite to the flowing direction of the fuel gas to the junction, water can be prevented from moving upstream of the fuel gas supply system from the point P. As a result, a corrosion of the fuel gas supply system due to water which remains in the fuel gas recirculating system can be prevented. In such a case, when ambient temperature drops below the freezing point, and the fuel cell system 10 causes a malfunction, such as malfunction of sensor(s) by frozen water adhering to the sensor(s). However, in this embodiment, the sensor(s) are provided upstream in the fuel gas supply system from the point P, and the bent portions 310 are formed, thereby reducing the adverse effects described above.

As can be seen from FIG. 3, the plurality of auxiliary machines 200 are disposed. between the fuel cell stack 100, and the piping member 300 including the bent portions 310 in the stacking direction of the fuel cell (Z-axis directions). Thus, a space between the fuel cell stack 100, and the piping member 300 including the bent portions 310 can effectively be utilized.

Figure 4:
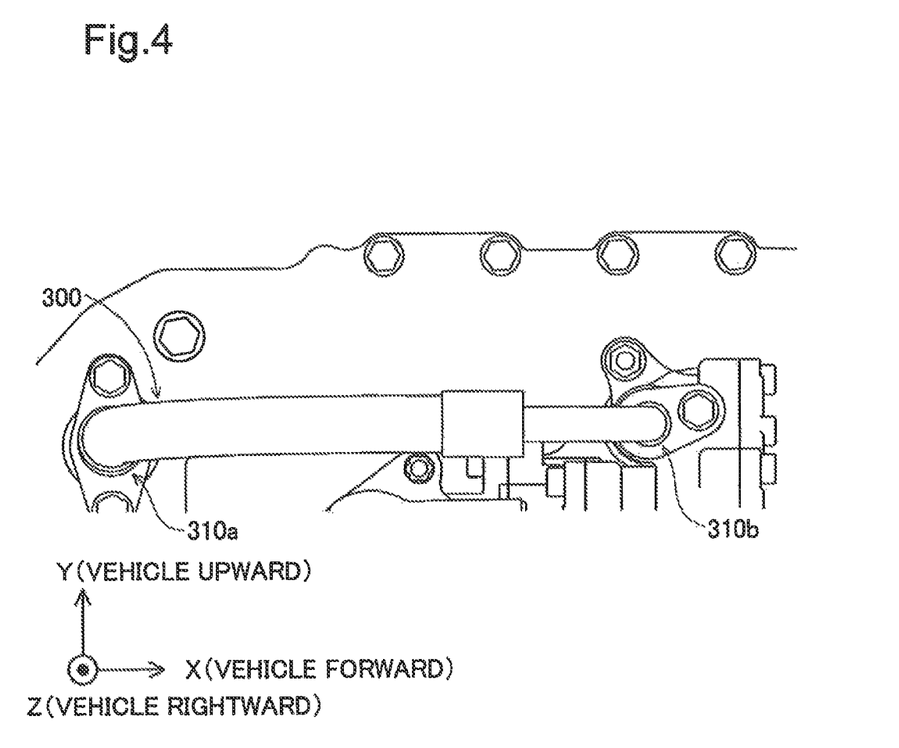
FIG. 4 is a schematic view of the piping member seen from the right side of the vehicle (seen from positive Z-axis direction)

FIG. 4 illustrates a schematic view of the piping member 300 seen from the right side of the vehicle (seen from positive Z-axis direction). As can be seen from this drawing, the piping member 300 curves in a substantially horizontal plane. For this reason, the corrosion of the fuel gas supply system due to water which remains in the fuel gas recirculating system can be reduced without increasing in the height of the fuel cell system 10. The phrase "substantially horizontal plane" as used herein refers to a plane of which inclination is less than ±15 degrees with respect to the horizontal plane.

Figure 5:
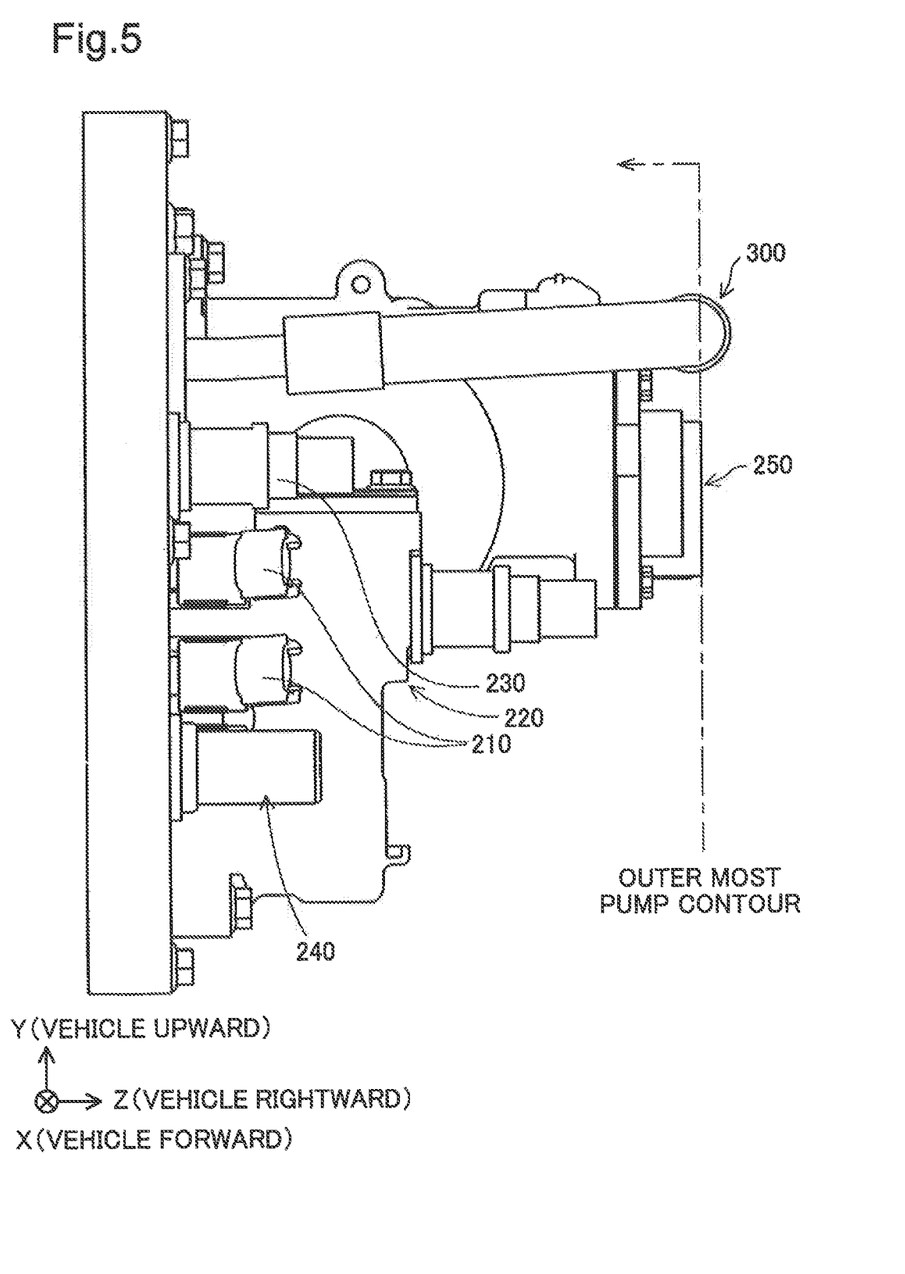
FIG. 5 is a schematic view of the piping member seen from the rear side of the vehicle (seen from negative X-axis direction)

FIG. 5 is a schematic view of the piping member 300 seen from the rear side of the vehicle (seen from positive X-axis direction). As can be seen from FIG. 5, the fuel gas pump 250 is provided at a position so as to overlap with at least a part of the piping member 300 in the stacking direction of the fuel cell (Z-axis directions). Note that since the fuel gas pump 250 requires high power, the strength of the fuel gas pump 250 is higher than other auxiliary machines. Thus, when the piping member 300 is collided from the right side of the vehicle (from positive Z-axis direction) by another adjacent member, this another adjacent member collides the fuel gas pump 250 before the piping member 300 is completely divided. Therefore, the possible dividing of the piping member 300 can be reduced.

Note that, in this embodiment, terminal portions of the fuel gas pump 250 are disposed at most distant locations from the fuel cell stack 100. The terminal portions are configured to have a higher strength than other components of the fuel gas pump 250.

As illustrated in FIG. 3, the piping member 300 is comprised of a member 300a, a member 300b and a member 300e. The member 300b is made of elastic material, and the members 300a and 300c are made of metal. Thus, when the another adjacent member collides the piping member 300 from the right side of the vehicle (from positive Z-axis direction), the possible dividing of the piping member 300 can be reduced by the member 300b elastically deforming.

As can be seen from FIG. 5, among the plurality of auxiliary machines, at least the part of the fuel gas pump 250 is located at the most distant position from the fuel cell stack 100 in the stacking directions (Z-axis directions) of the fuel cell. The injector 210, the distribution piping 220, the pressure sensor 230, and the pressure relief valve 240 are disposed between the fuel cell stack 100 and the terminal portions of the fuel gas pump 250, in the stacking direction (Z-axis directions) of the fuel cell.

Figure 6:
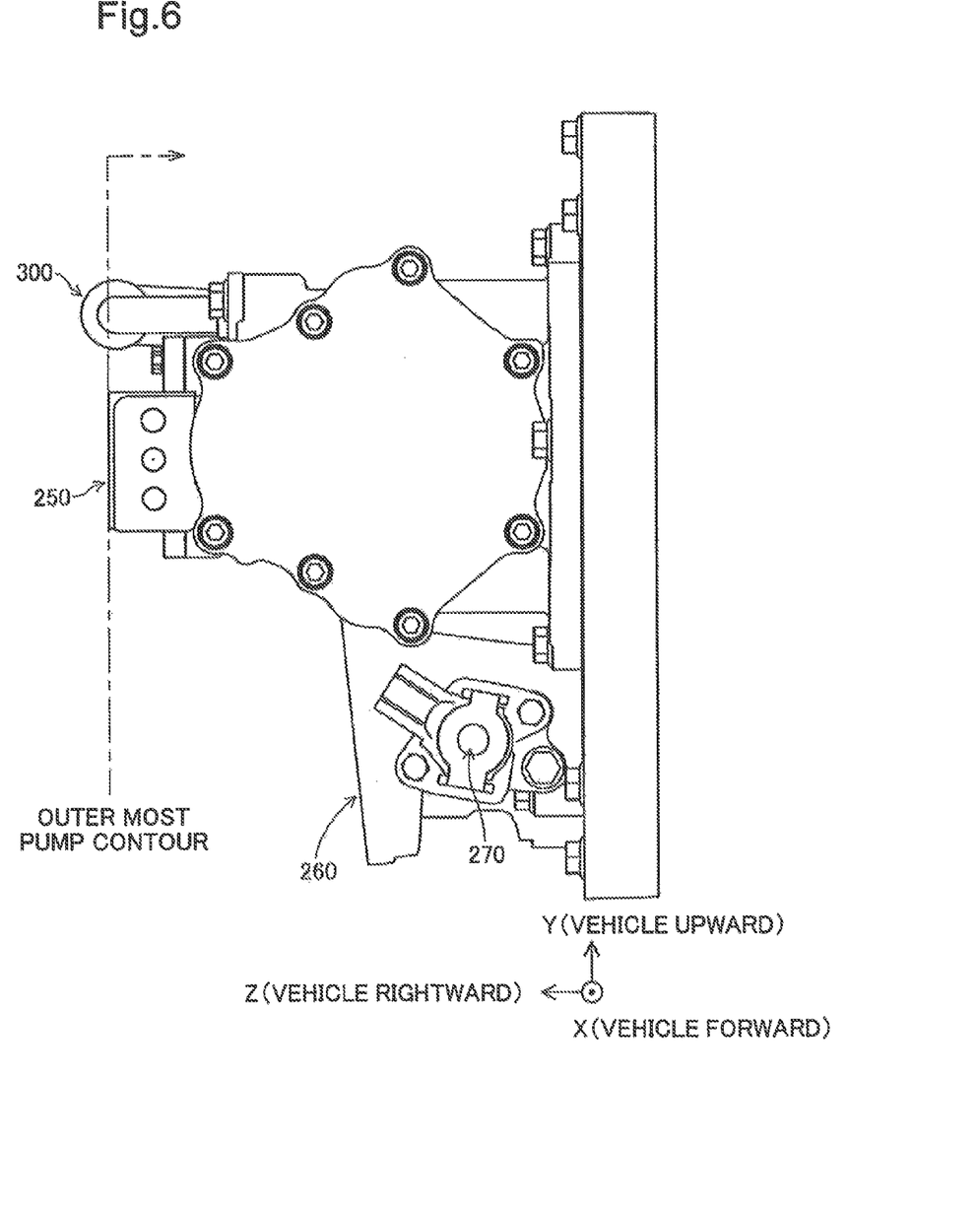
FIG. 6 is a schematic view of the piping member seen from the front side of the vehicle (seen from positive X-axis direction)

FIG. 6 is a schematic view of the piping member 300 seen from the front side of the vehicle (seen from positive X-axis direction). As can be seen from FIG. 6, the gas-liquid separator 260 and the purge valve 270 are disposed between the fuel cell stack 100 and the terminal portions of the fuel gas pump 250, in the stacking direction of the fuel cell (Z-axis directions).

Thus, when other adjacent members collides the plurality of auxiliary machines 200 from the right side of the vehicle (from positive Z-axis direction), the fuel gas pump 250 collides other adjacent members before other auxiliary machines collides. Therefore, the auxiliary machines which are weaker in strength than the fuel gas pump 250 can be protected.

B. Modification

B1. Modification 1

In this embodiment, a part of the piping member 300 between the bent portion 310a and the bent portion 310b is straight or linear. However, the present invention does not limit the shape to the straight or linear shape.

Figure 7:
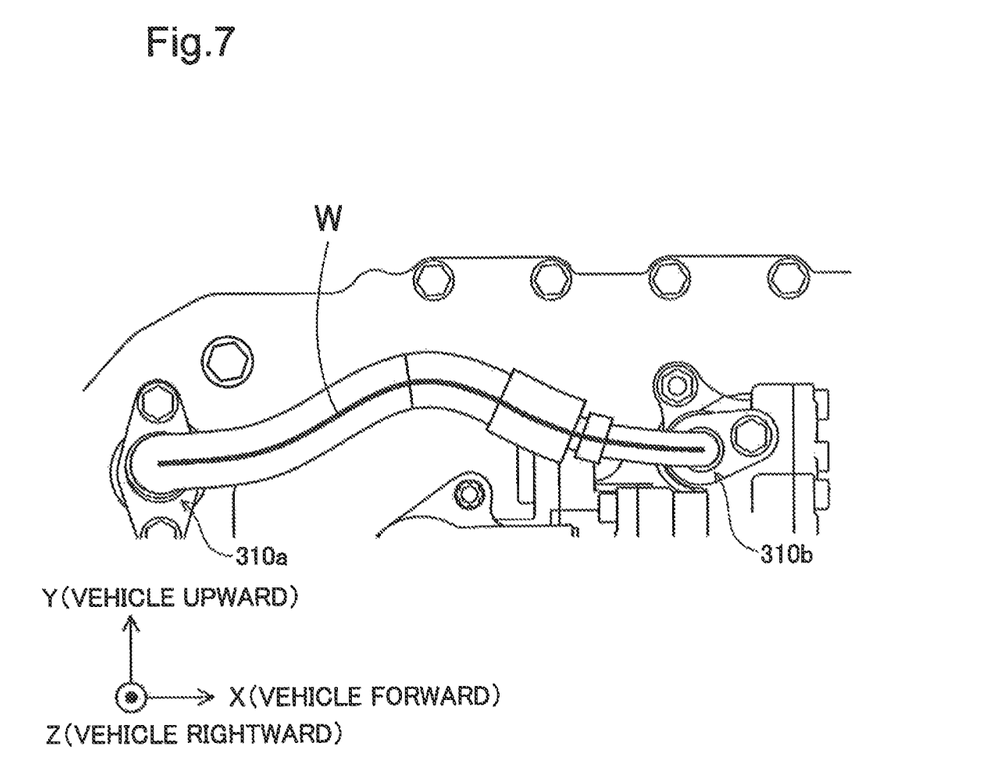
FIG. 7 is a schematic view illustrating a piping member in Modification 1.

FIG. 7 is a schematic view illustrating a piping member in Modification 1. The piping member may be bent along a line W between the bent portion 310a and the bent portion 310b. Since the highest part of the piping member is lower than the height of the fuel cell stack 100, the fuel cell system 10 can be prevented from becoming higher, or any part of the piping member exceeds upwardly the upper contour of the fuel cell stack 100.

The present invention is not limited to the embodiment and the modifications described above, and can be implemented in various structures without departing from the scope of the invention. For example, technical features in the embodiment and the modifications corresponding to technical features of each aspect cited in the section of "SUMMARY," can suitably be substituted and/or combined in order to address some or all of the subjects described above, or in order to obtain some or all of the effects described above. The technical features can suitably be deleted if they are not described as essential matters in this specification.

What is claimed is:

1. A fuel cell system, comprising:
   a fuel cell stack that is formed by stacking fuel cells for causing electrochemical reaction of a fuel gas and an oxidizing gas;
   a fuel gas supply system that is configured to supply the fuel gas to the fuel cell stack from a supply source of the fuel gas;
   a fuel gas recirculating system that is configured to resupply to the fuel cell stack the fuel gas discharged from the fuel cell stack;
   a piping member is configured to connect a junction between the fuel gas supply system and the fuel gas recirculating system with the supply source, the piping member having a bent portion that is curved such that a supply direction of the fuel gas from the supply source is reverse to a flowing direction of the fuel gas toward the junction; and a plurality of auxiliary machines used for operation of the fuel cell stack, the plurality of auxiliary machines being disposed between the fuel cell stack and the piping member in stacking directions of the fuel cell, wherein, the plurality of auxiliary machines include a fuel gas pump for recirculating the fuel gas in the fuel gas recirculating system, and the fuel gas pump is disposed at a position where the fuel gas pump overlaps with at least a part of the piping member in the stacking directions of the fuel cell.

2. The fuel cell system in accordance with claim 1, wherein at least a part of the fuel gas pump is disposed at the most distant position from the fuel cell stack in the stacking direction of the fuel cell, among the plurality of auxiliary machines.

* * * * *